US009624771B2

(12) United States Patent
de Lore et al.

(10) Patent No.: US 9,624,771 B2
(45) Date of Patent: Apr. 18, 2017

(54) TAKE-UP MECHANISM FOR CONVEYOR SYSTEM

(71) Applicant: Joy MM Delaware, Inc., Wilmignton, DE (US)

(72) Inventors: Andrew P. de Lore, Yattalunga (AU); Travers T. Wood, Springfield (AU)

(73) Assignee: Joy MM Delaware, Inc., Wilmington, DE (US)

(*) Notice: Subject to any disclaimer, the term of this patent is extended or adjusted under 35 U.S.C. 154(b) by 0 days.

(21) Appl. No.: 15/085,160

(22) Filed: Mar. 30, 2016

(65) Prior Publication Data
US 2016/0289006 A1 Oct. 6, 2016

Related U.S. Application Data

(60) Provisional application No. 62/139,902, filed on Mar. 30, 2015.

(51) Int. Cl.
*B65G 23/44* (2006.01)
*B65G 21/14* (2006.01)
*E21F 13/06* (2006.01)

(52) U.S. Cl.
CPC ............ *E21F 13/066* (2013.01); *B65G 21/14* (2013.01); *B65G 23/44* (2013.01)

(58) Field of Classification Search
CPC ................................. B65G 23/44; B65G 21/14
USPC .................................. 198/588, 812, 813, 815
See application file for complete search history.

(56) References Cited

U.S. PATENT DOCUMENTS

| 2,852,127 | A | 9/1958 | Barrett |
| 2,858,934 | A | 11/1958 | Carlson et al. |
| 2,893,539 | A | 7/1959 | Baechli |
| 2,909,273 | A | 10/1959 | Smith |
| 2,986,266 | A | 5/1961 | Moon |
| 2,992,723 | A | 7/1961 | Poundstone |

(Continued)

FOREIGN PATENT DOCUMENTS

| EP | 0122573 A2 | 10/1984 |
| JP | 2989822 B1 | 12/1999 |

OTHER PUBLICATIONS

Search Report from the United Kingdom Intellectual Property Office for Application No. GB16052841 dated Nov. 16, 2016 (4 pages).

*Primary Examiner* — James R Bidwell
(74) *Attorney, Agent, or Firm* — Michael Best & Friedrich LLP

(57) ABSTRACT

A tensioning mechanism for a conveyor system includes a first end including a drive unit, an anchor structure, a continuous belt extending at least partially between the drive unit and the anchor structure, a first carriage, and a second carriage. The first carriage is coupled to the drive unit and supports a portion of the belt. The first carriage is supported for movement relative to the drive unit to adjust a tension in the belt, and the first carriage is movable between the drive unit and an intermediate position. The second carriage is releasably secured to the anchor structure and supports another portion of the belt. The second carriage is supported for movement relative to the anchor structure between a first position and a second position. A distance between the first end and the second carriage defining a take-up length, and movement of the second carriage changes the take-up length.

20 Claims, 15 Drawing Sheets

(56) References Cited

U.S. PATENT DOCUMENTS

| | | | | |
|---|---|---|---|---|
| 3,054,499 | A | * | 9/1962 | Petix ................ B65G 23/44 198/815 |
| 3,125,209 | A | | 3/1964 | Butler et al. |
| 3,352,406 | A | | 11/1967 | Long |
| 4,033,451 | A | * | 7/1977 | Kelsall ............... B65G 23/44 198/815 |
| 4,146,126 | A | | 3/1979 | Mattos |
| 4,189,047 | A | * | 2/1980 | Beckius ............. B65G 21/18 198/778 |
| 4,378,875 | A | * | 4/1983 | Allan ................. B65G 17/02 198/815 |
| 4,474,287 | A | | 10/1984 | Thompson |
| 5,190,352 | A | | 3/1993 | LeBegue et al. |
| 5,398,911 | A | * | 3/1995 | Holster .............. B66D 1/50 192/12 B |
| 6,220,425 | B1 | * | 4/2001 | Knapp ............... B65G 17/126 198/709 |
| 6,308,819 | B1 | | 10/2001 | Riffe |
| 6,695,130 | B1 | * | 2/2004 | Blaylock ........... B65G 23/44 198/813 |
| 2014/0311875 | A1 | * | 10/2014 | McKnight-MacNeil B60S 3/004 198/813 |

* cited by examiner

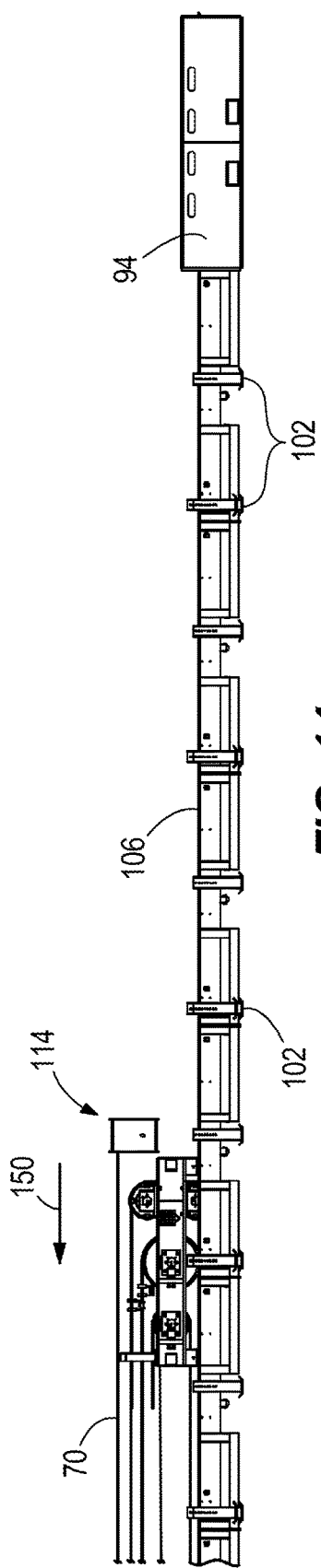
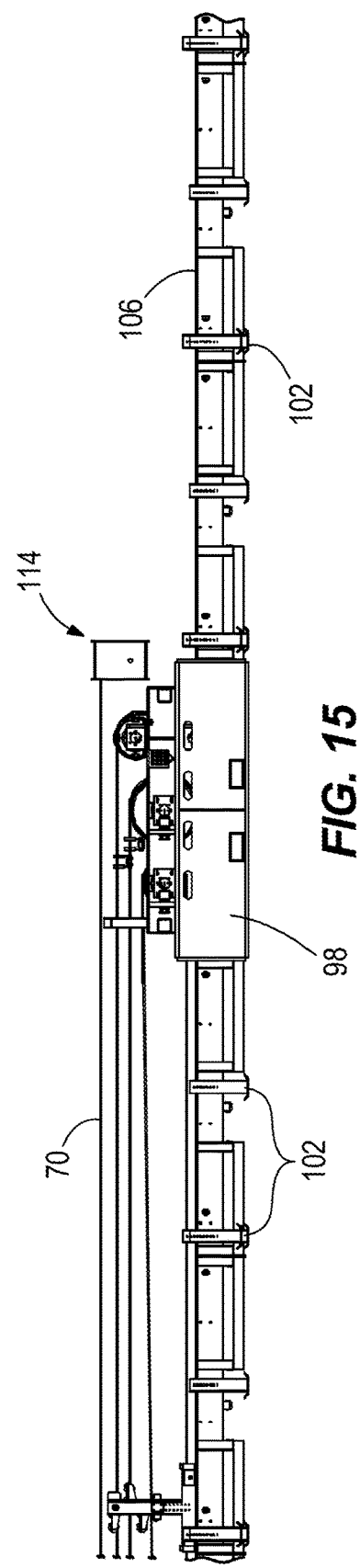

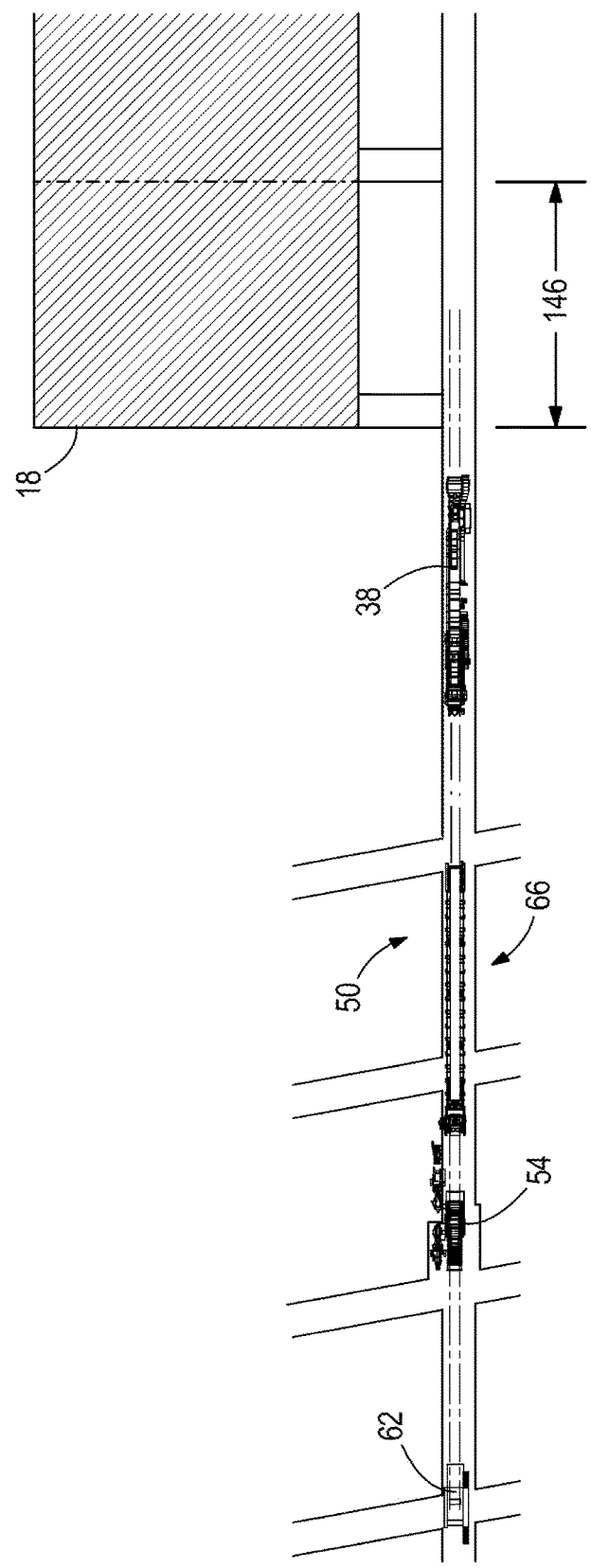

TAKE-UP MECHANISM FOR CONVEYOR SYSTEM

CROSS-REFERENCE TO RELATED APPLICATION

This application claims the benefit of prior-filed, co-pending U.S. Provisional Patent Application No. 62/139,902, filed Mar. 30, 2015, the entire contents of which are incorporated by reference herein.

BACKGROUND

The present disclosure relates to conveyor systems, and particularly to a take-up mechanism for a conveyor system.

Conveyor systems require a belt tensioning device, which can take many different forms. Some underground mining conveyor systems include a tensioning or take-up mechanism that also provides belt storage (e.g., in a belt lap arrangement). Such a system is referred to as a loop take-up ("LTU"). As the mining operation progresses, the length of travel of the belt changes, and the LTU maintains tension in the belt to accommodate the change in length.

SUMMARY

In one aspect, a conveyor system includes a first end configured to receive material, a second end for discharging the material, a continuous belt traveling in an endless loop between the first end and the second end, a drive motor for moving the continuous belt between the first end and the second end, and a tensioning mechanism engaging a portion of the continuous belt. The tensioning mechanism includes a stationary end including a drive unit, an anchor structure, a first carriage and a second carriage. The first carriage is coupled to the drive unit and supports a portion of the belt. The first carriage is driven by the drive unit and supported for movement relative to the stationary end to adjust a tension in the belt. The second carriage is releasably secured to the anchor structure and supports another portion of the belt. The second carriage is supported for movement relative to the anchor structure between a first position and a second position. A first distance between the first position and the drive unit is different from a second distance between the second position and the drive unit.

In another aspect, a tensioning mechanism for a conveyor system includes a first end including a drive unit, an anchor structure, a continuous belt extending at least partially between the drive unit and the anchor structure, a first carriage, and a second carriage. The first carriage is coupled to the drive unit and supports a portion of the belt. The first carriage is supported for movement relative to the drive unit to adjust a tension in the belt, and the first carriage is movable between the drive unit and an intermediate position located between the drive unit and the anchor structure. The second carriage is releasably secured to the anchor structure and supports another portion of the belt. The second carriage is supported for movement relative to the anchor structure between a first position and a second position. A distance between the first end and the second carriage defining a take-up length, and movement of the second carriage changes the take-up length.

In yet another aspect, a method is provided for changing a physical length of a tensioning mechanism for a conveyor system. The tensioning mechanism includes a first carriage supported for movement relative to a first end and a second carriage releasably secured to a first anchor structure proximate a second end. The first carriage supports a portion of a continuous belt, and the second carriage supports another portion of the continuous belt. The method includes: unsecuring the second carriage relative to the first anchor structure; moving the second carriage along a support structure away from the first anchor structure; and securing the second carriage to a second anchor structure at a second position.

Other aspects will become apparent by consideration of the detailed description and accompanying drawings.

BRIEF DESCRIPTION OF THE DRAWINGS

FIG. 14 is a side view of the loop take-up of FIG. 6 with the static carriage in a first position.

FIG. 15 is a side view of the loop take-up of FIG. 6 with the static carriage in a second position.

FIG. 18 is a top view of the mining operation of FIG. 2 with the loop take-up in a contracted state.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1A:
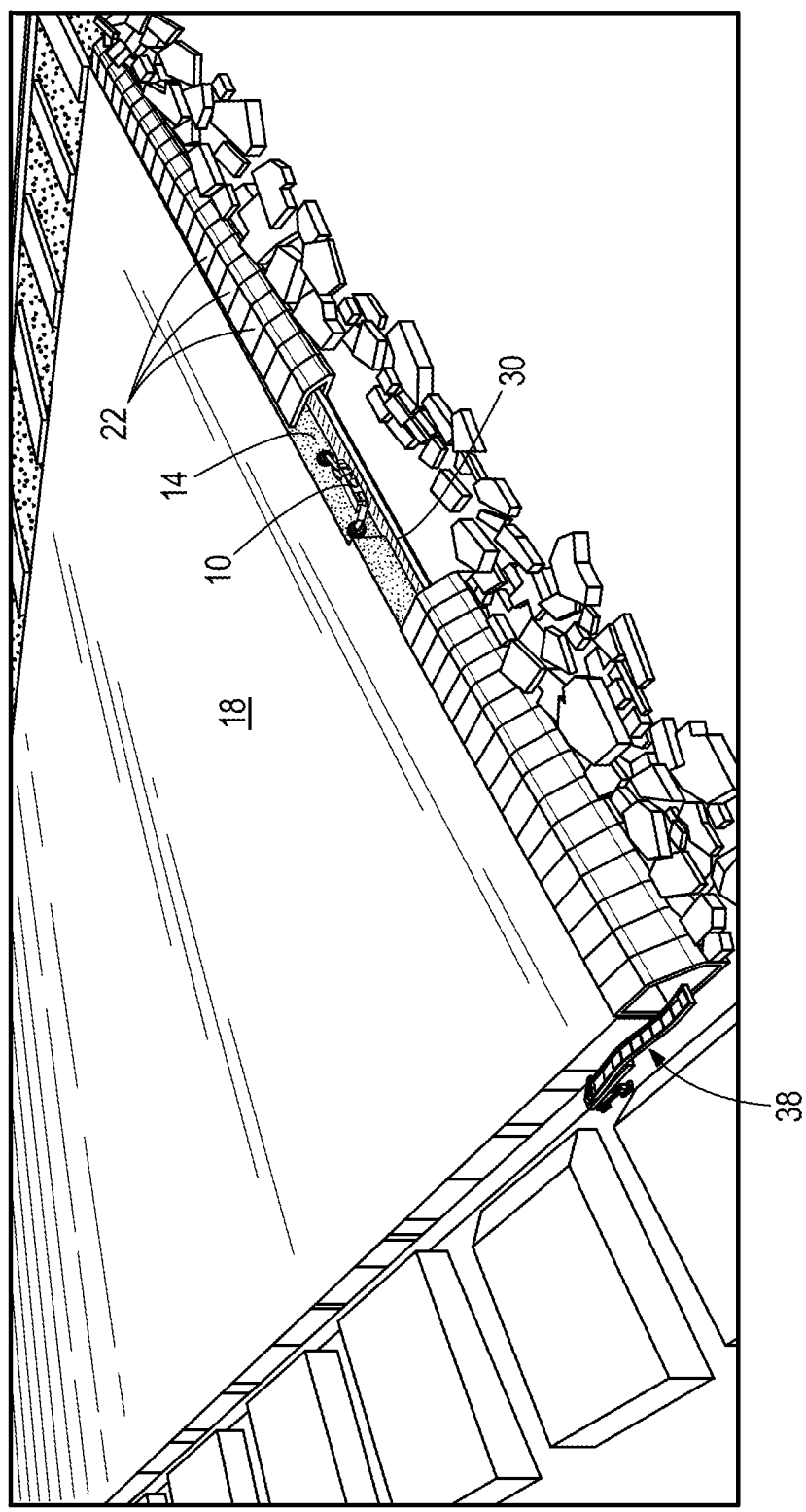
FIG. 1A is a perspective view of a mining operation.
Figure 1B:
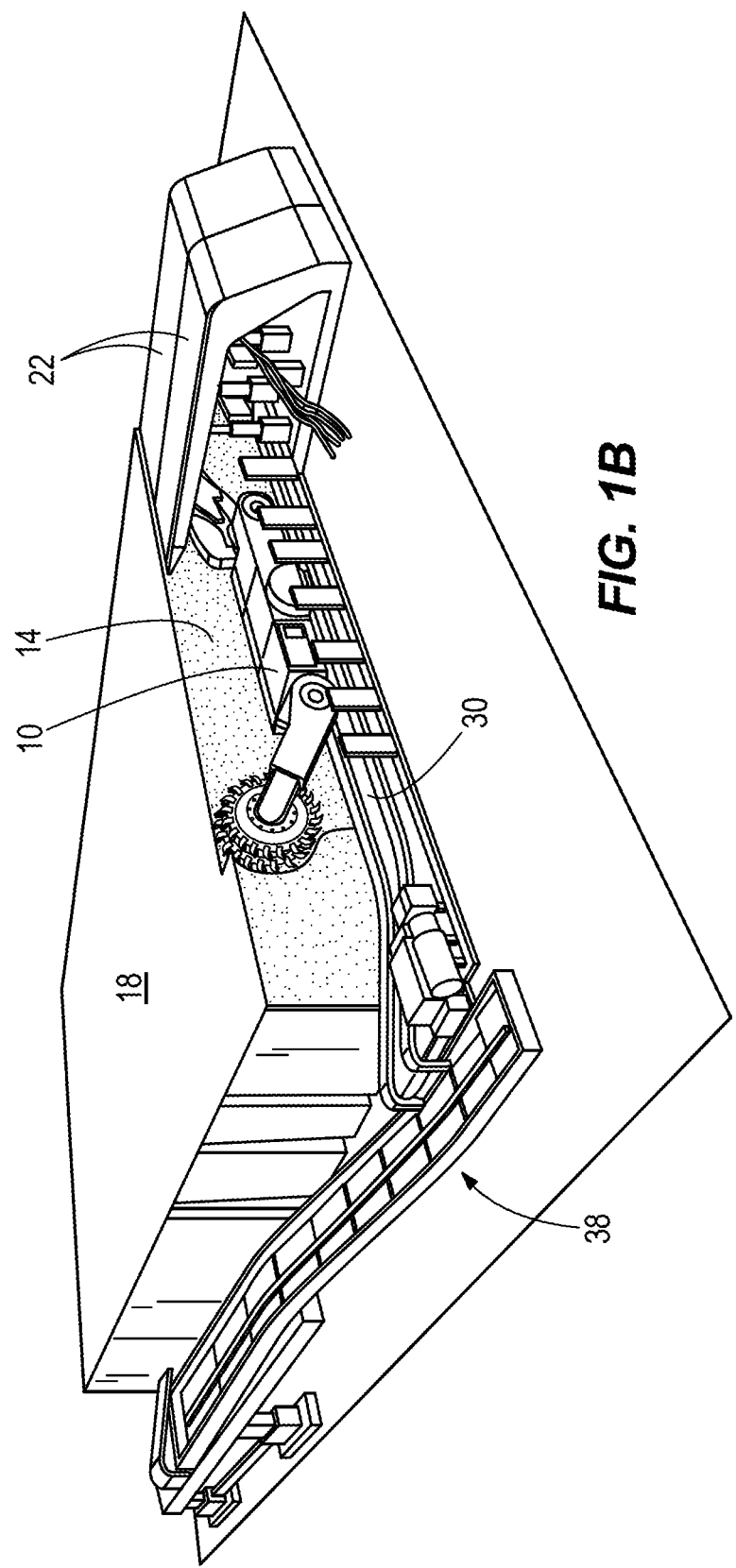
FIG. 1B is an enlarged perspective view of the mining operation of FIG. 1A.

FIGS. 1A and 1B illustrate a longwall mining operation. A mining machine 10 excavates material from a mine face 14 of a mineral seam 18, progressing through the seam 18 as material is removed. In the illustrated embodiment, the mining machine 10 is a conventional longwall shearer, and the structure and operation of the shearer may be readily understood by a person of ordinary skill in the art. In other embodiments, a different type of mining machine may be used. Roof supports 22 are aligned in a row along the length of the mine face 14 to provide protection (a portion of the roof supports 22 are removed in FIGS. 1A and 1B to illustrate the mining machine 10 mine face 14). After the shearer 10 removes material from the mine face 14, the material is directed onto a face conveyor 30, which conveys the material generally parallel to the mine face 14. The material is then deposited on a beam stage loader 38.

Figure 2:
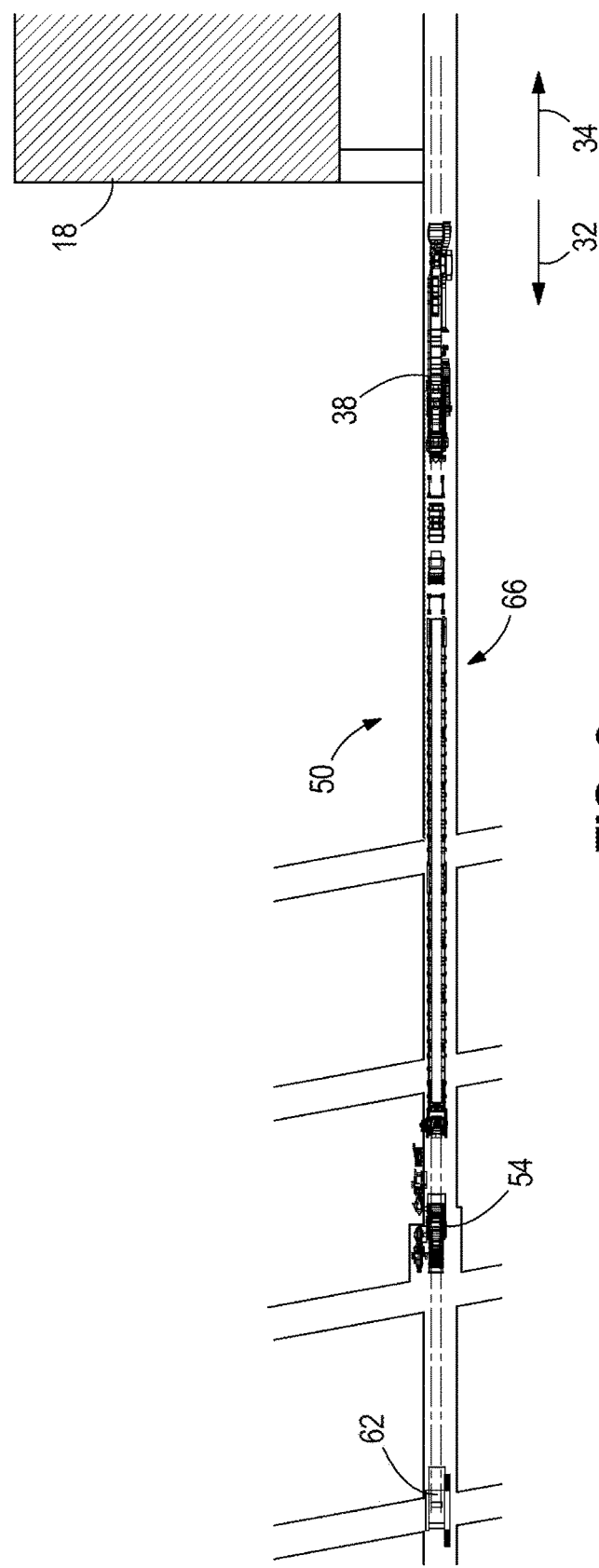
FIG. 2 is a top view of the mining operation of FIG. 1.

As shown in FIG. 2, in the illustrated embodiment, the mining operation is "retreating" such that the shearer 10 progresses through the seam 18 in a direction oriented toward a mine exit (e.g., to the left in FIG. 2). In other embodiments, the operation may be "advancing" such that the shearer 10 progresses through the seam 18 in a direction oriented away from the mine exit (e.g., to the right in FIG. 2).

After the beam stage loader 38 receives the material, the material is transported to a gate conveyor 50. The gate conveyor 50 includes a drive unit 54, a discharge portion 62, and a tensioning mechanism or loop take-up 66 (hereinafter referred to as the "LTU"). The gate conveyor 50 also includes a belt 70 that extends in a continuous loop between the end adjacent the beam stage loader 38 and the discharge portion 62. In the illustrated embodiment, the LTU 66 is positioned outbye of the beam stage loader 38 and inbye of the drive unit 54. As used herein, the term "outbye" refers to a direction away from the mine face 14, and the term "inbye" refers to a direction toward the mine face 14. In the illustrations of FIGS. 2-6, the outbye direction 32 is oriented toward the left, and the inbye direction 34 is oriented toward the right.

Figure 3:
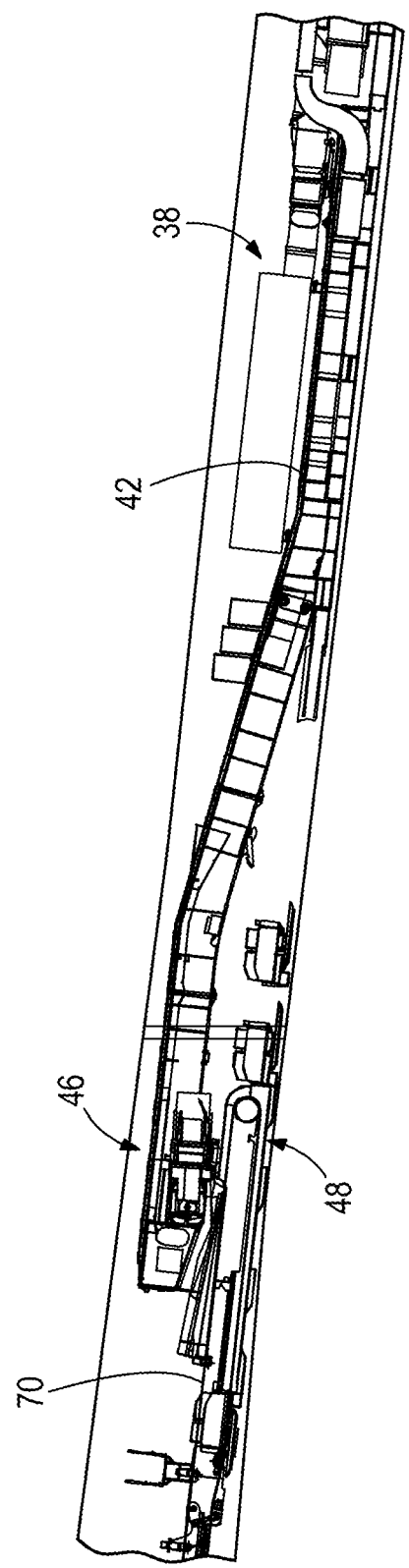
FIG. 3 is a side view of a beam stage loader.

As shown in FIG. 3, the beam stage loader 38 includes a conveyor portion 42 (e.g., a chain conveyor), and a sizer 46. The conveyor portion 42 receives the material from the face conveyor 30 and moves the material into the sizer 46, which crushes and breaks the material to reduce it to a desired size. In the illustrated embodiment, the beam stage loader 38 also supports an end 48 of the gate conveyor 50, which receives the reduced material. As shown in the side views of FIGS. 3-5, the gate conveyor 50 is generally supported on an inclined surface.

Figure 4:
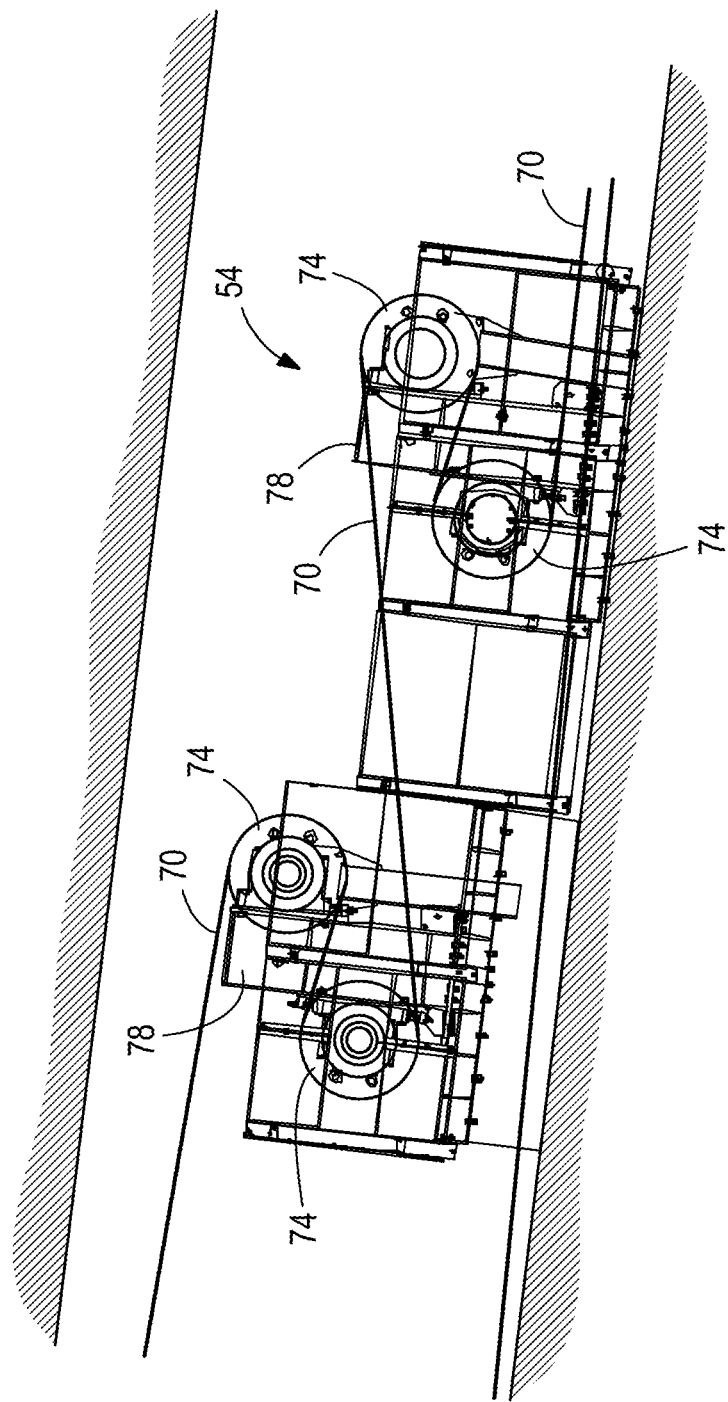
FIG. 4 is a side view of a drive unit of a gate conveyor.
Figure 5:
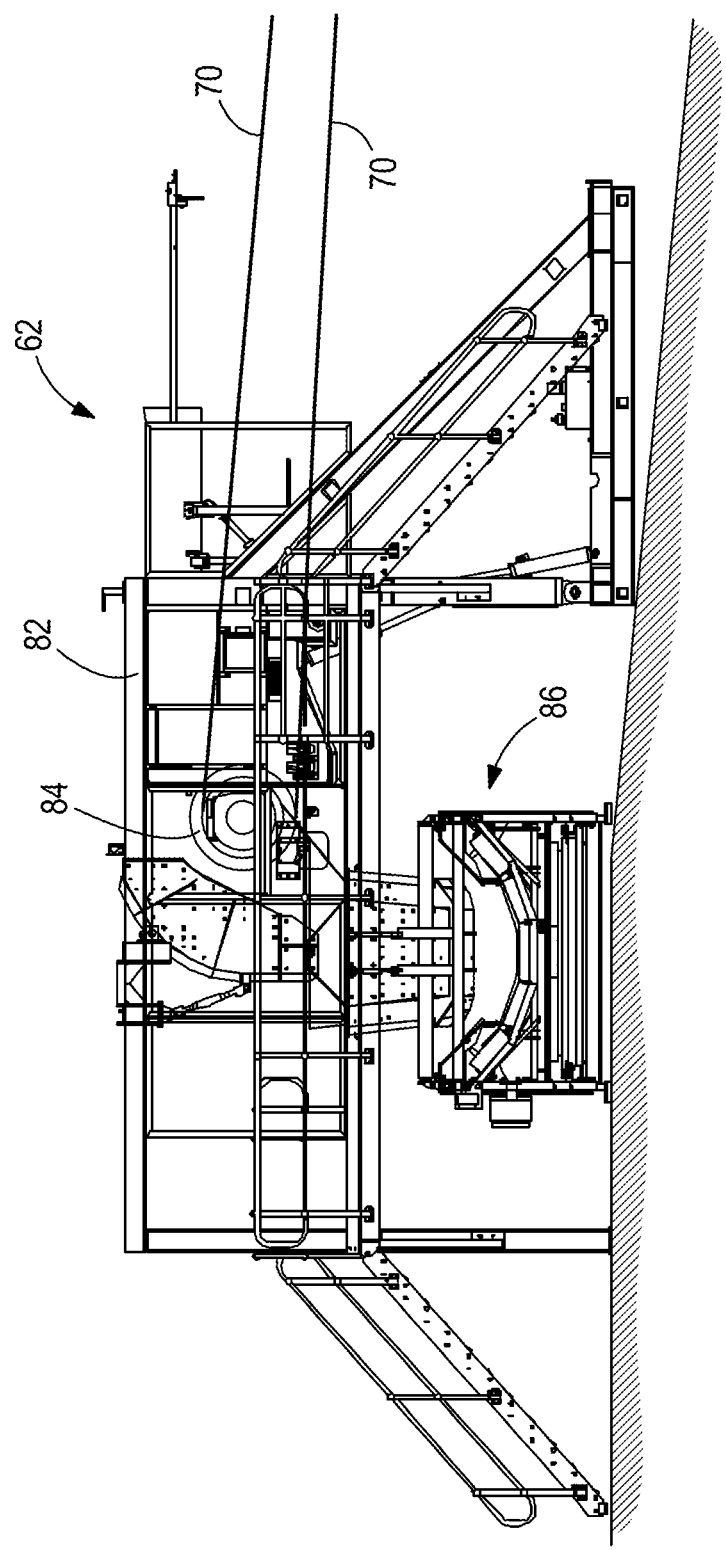
FIG. 5 is a side view of a discharge portion of a gate conveyor.

As shown in FIG. 4, the drive unit 54 includes pulleys 74 and one or more motors 78 for rotating at least one of the pulleys 74. The pulleys 74 support and move the belt 70 to convey the mined material from the beam stage loader 38 to the discharge portion 62. Referring to FIG. 5, the discharge portion 62 includes a structure 82 supporting an end 84 of the belt 70. Once material reaches the end 84 of the belt 70, the material is deposited onto an auxiliary conveyor 86 and transported out of the mine. In some embodiments, the material may be deposited on a haulage vehicle instead of the auxiliary conveyor 86.

Figure 6:
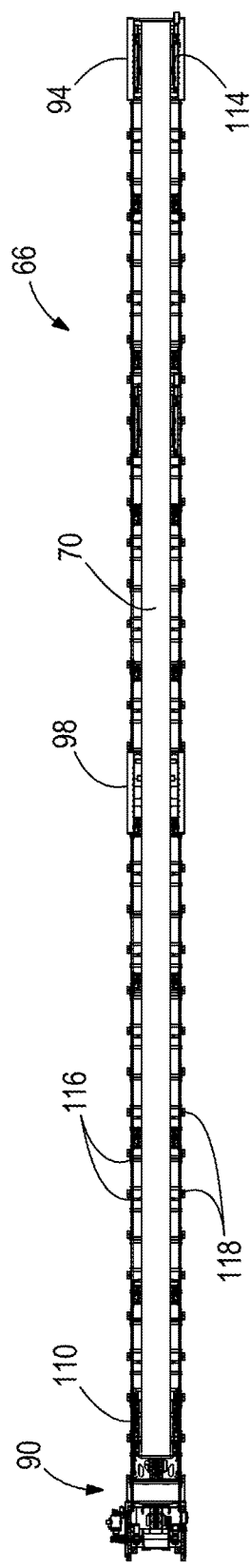
FIG. 6 is a top view of a loop take-up for a gate conveyor.
Figure 7:
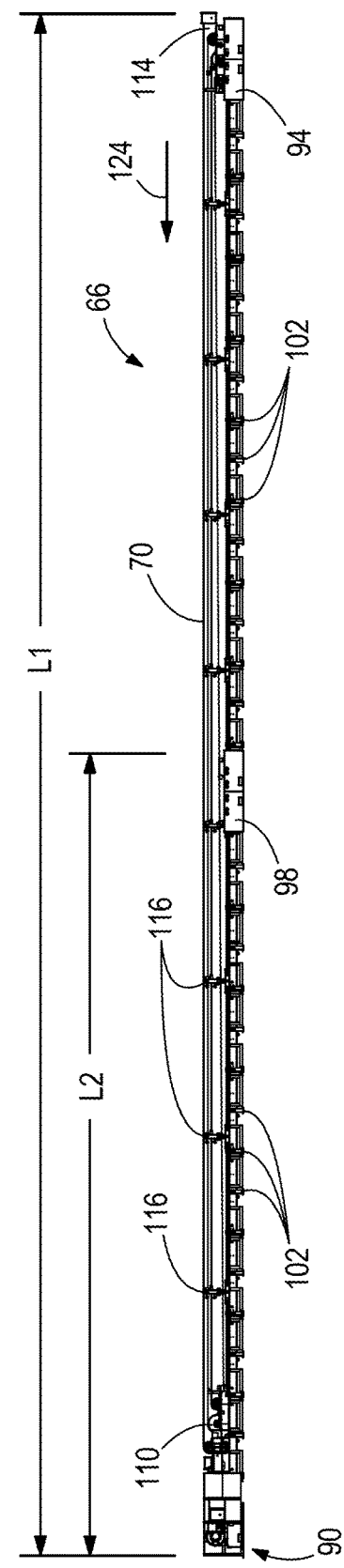
FIG. 7 is a side view of the loop take-up of FIG. 7.

FIGS. 6 and 7 illustrate the LTU 66. Although FIGS. 6 and 7 show only the portion of the belt 70 engaging the components of the LTU 66, it is understood that the belt 70 continues to travel between the end 48 of the gate conveyor 50 proximate the beam stage loader 38 (FIG. 3) and the end 84 proximate the discharge portion 62 (FIG. 5).

The LTU 66 includes a control or winch module 90, a primary anchor structure or anchor module 94, and a secondary anchor structure or anchor module 98. The winch module 90 is positioned at a first end of the LTU 66, and the primary anchor module 94 defines a second end of the LTU 66. The secondary anchor module 98 is positioned between the winch module 90 and the primary anchor module 94. In the illustrated embodiment, the secondary anchor module 98 is inbye of the winch module 90 and outbye of the primary anchor module 94. In addition, the LTU 66 includes a support structure in the form of standard frames or standard modules 102 positioned between the winch module 90 and the secondary anchor module 98, and positioned between the second anchor module 98 and the primary anchor module 94. Each standard module 102 is supported on the ground or mine floor. In the illustrated embodiment, each standard module 102 includes rolls (not shown) to support at least a lower run of the belt 70, and rails 106 (FIGS. 8 and 9) extend between adjacent standard modules 102.

Figure 8:
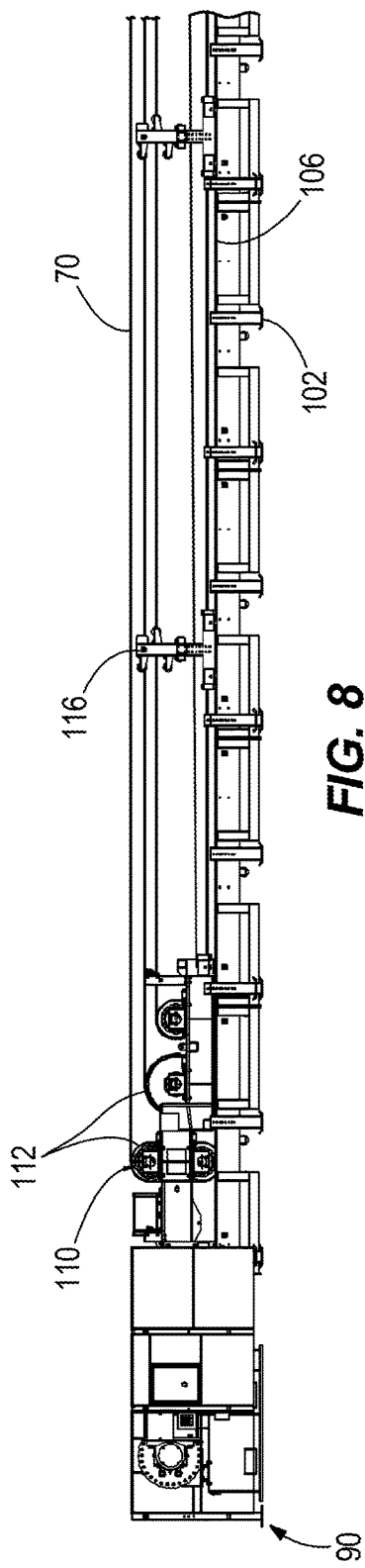
FIG. 8 is an enlarged side view of an end of the loop take-up of FIG. 6.
Figure 9:
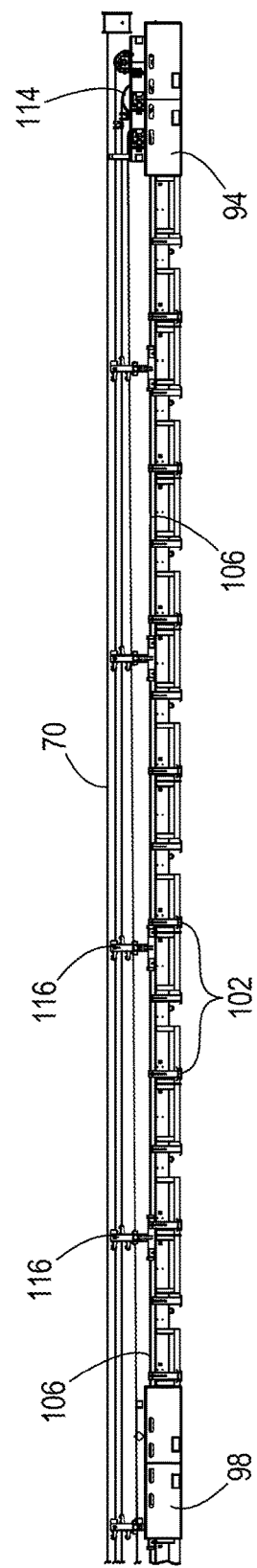
FIG. 9 is an enlarged side view of another end of the loop take-up of FIG. 6

As shown in FIGS. 8 and 9, the LTU 66 further includes a first carriage or dynamic carriage 110 positioned proximate the winch module 90 and a second carriage or static carriage 114 positioned proximate the primary anchor module 94. Idler modules 116 are supported on the standard modules 102 and positioned between the dynamic carriage 110 and the static carriage 114. Similar to the standard modules, the idler modules 116 may include rolls 118 (FIG. 6) for supporting an upper run of the belt 70. Also, the dynamic carriage 110 includes rolls 112 (FIG. 8), and the belt 70 is wrapped around portions of the rolls 112 of the dynamic carriage 110.

The dynamic carriage 110 is movable (e.g., by rollers—not shown) along the rails 106 supported by the standard modules 102. The dynamic carriage 110 is tethered to the winch module 90 by a cable or rope (not shown). In one embodiment, the winch module 90 is driven by a variable speed gearbox and motor (not shown) and controlled by a feedback loop in communication with a load cell (not shown) that senses the tension of the belt 70. If the winch module 90 pays out cable, the dynamic carriage 110 is permitted to move along the rails 106 in order to maintain a desired tension in the belt 70. Similarly, the winch module 90 may reel in the cable to move the dynamic carriage 110 toward the winch module 90. The operation of the winch module 90 and the dynamic carriage 110 may be consistent with a winch and movable carriage in a conventional loop take-up and would be apparent to a person of ordinary skill in the art.

In one embodiment, moving the dynamic carriage 110 away from the winch module 90 increases the travel length of the belt 70, thereby taking up slack in the belt 70 and increasing tension in the belt 70. Moving the dynamic carriage 110 toward the winch module 90 decreases the travel length of the belt 70, thereby reducing tension in the belt 70. It is often necessary to add or remove belt 70 from the LTU 66 (e.g., as the overall conveyor length expands or contracts to accommodate the progress of the mining operation). In one embodiment, belt 70 is added when the gate conveyor 50 is extending and the dynamic carriage 110 travels close to the primary anchor module 94, and belt 70 is removed when the gate conveyor 50 is retracting and the dynamic carriage 110 travels close to the winch module 90.

In the configuration shown in FIG. 9, the static carriage 114 is secured against movement relative to the primary anchor module 94. As discussed in further detail below, the static carriage 114 can be unlocked relative to the primary anchor module 94 such that the static carriage 114 also moves along the rails 106 supported by the standard modules 102.

Referring now to FIGS. 10-13, the static carriage 114 includes a frame 122 and second rolls or pulleys 126 supported on the frame 122 for rotation relative to the frame 122. The belt 70 (FIG. 13) is wrapped onto at least a portion of the pulleys 126. In the illustrated embodiment, the static carriage 114 also includes rollers 130 (FIG. 13) supported on the frame 122. In one embodiment, the rollers 130 engage internal tracks or rails 134 (FIG. 12) formed on the primary anchor module 94 to support the static carriage 114 for movement relative to the primary anchor module 94. In some embodiments, the secondary anchor module may include similar rails (not shown) for supporting the movement of the static carriage 114. Although not shown in detail, it is understood that in some embodiments the rollers 130 engage the rails 106 (FIG. 9) supported by the standard modules 102 to facilitate movement of the static carriage 114. When the static carriage 114 is not being moved, spacer plates (not shown) may be inserted to space the rollers 130 away from the rails 134.

Figure 10:
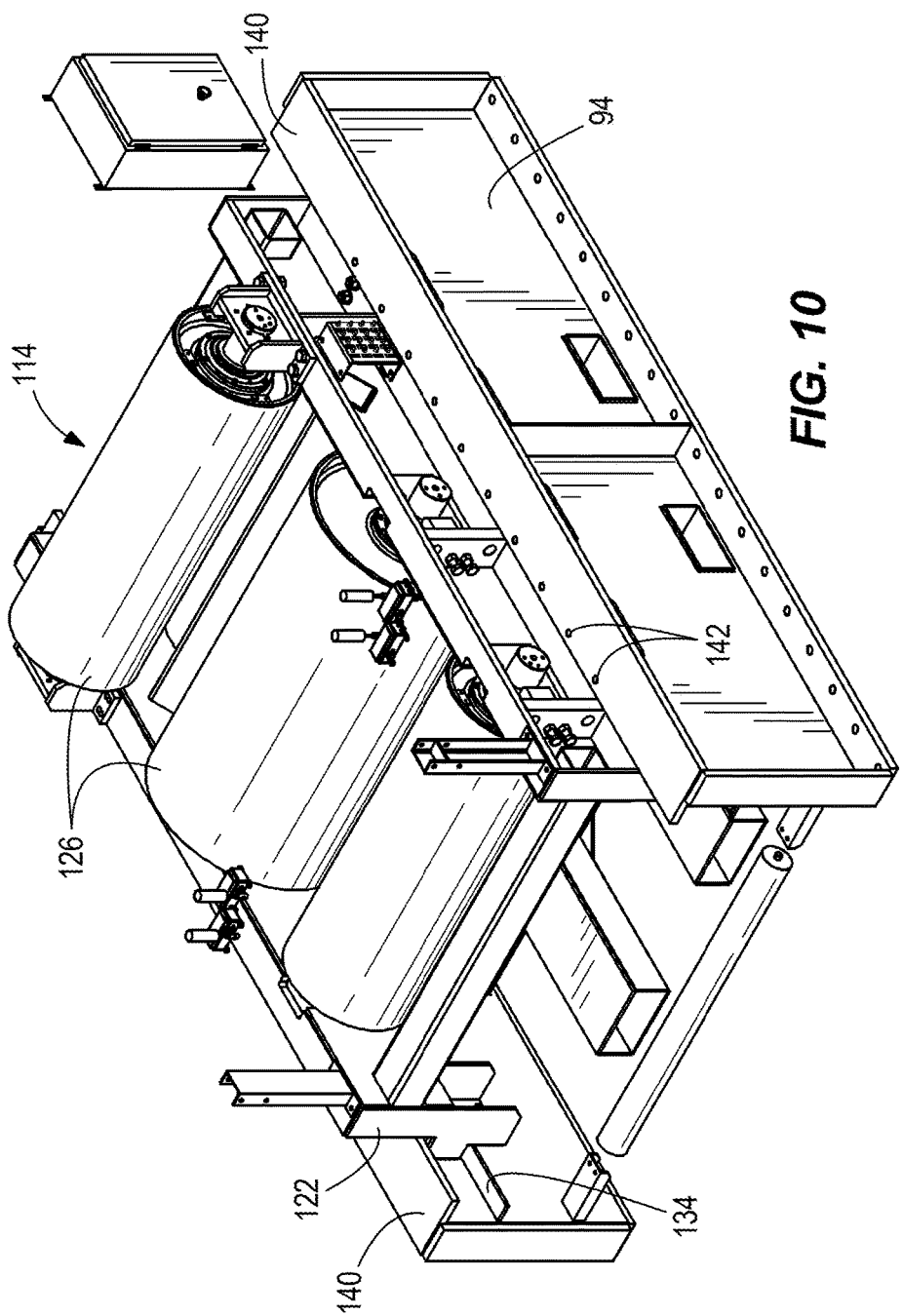
FIG. 10 is a perspective view of a static carriage and a primary anchor module.
Figure 11:
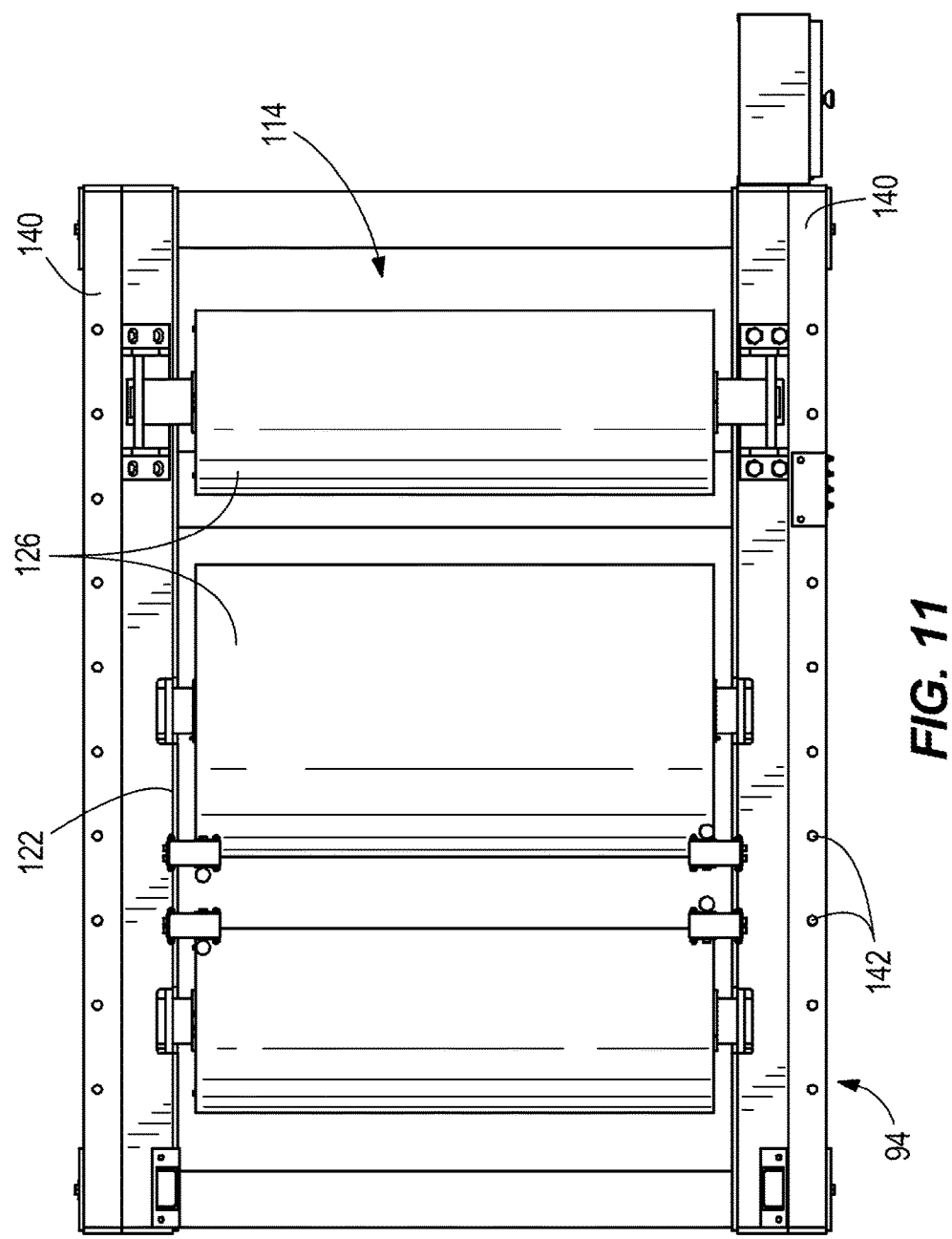
FIG. 11 is a top view of the static carriage and the primary anchor module of FIG. 10.
Figure 12:
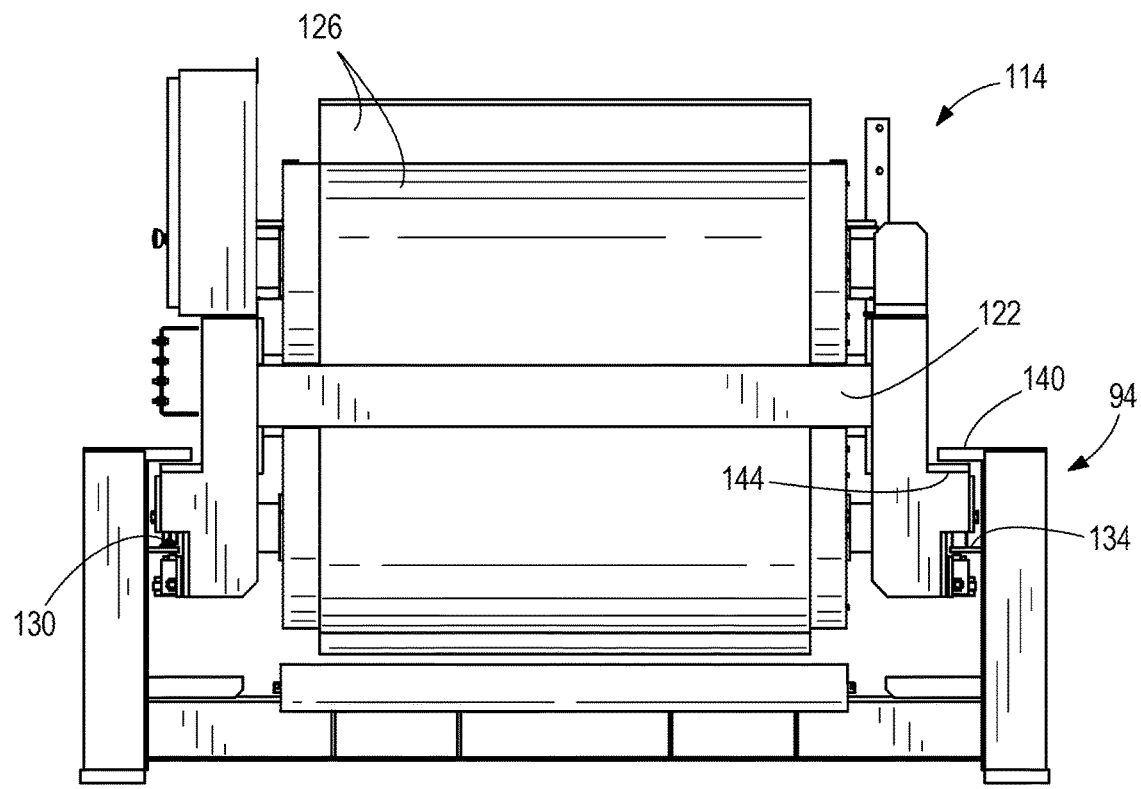
FIG. 12 is an end view of the static carriage and the primary anchor module of FIG. 10.
Figure 13:
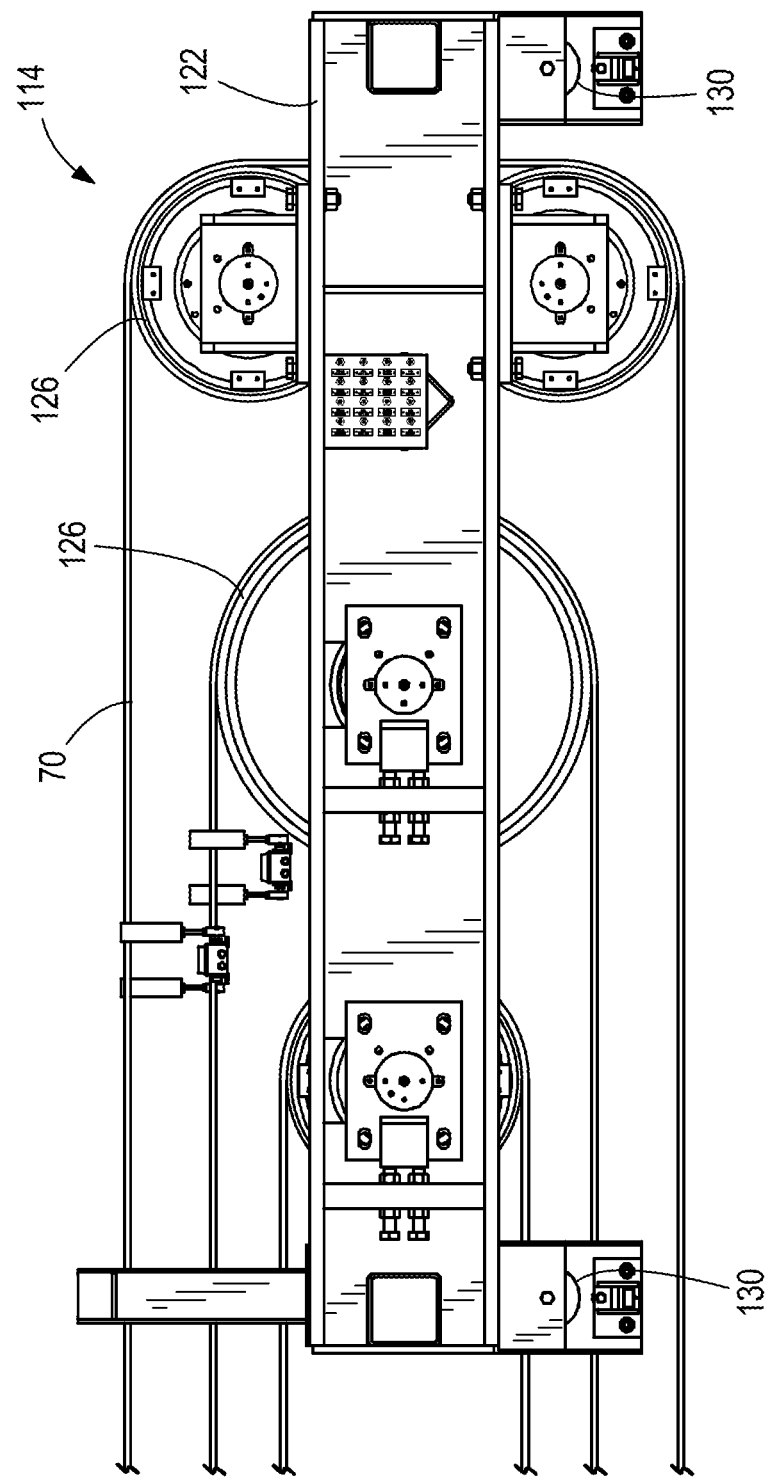
FIG. 13 is a side view of static carriage of FIG. 10, with the primary anchor module removed.

As shown in FIGS. 10-12, the static carriage 114 is releasably secured to the primary anchor module 94. In the illustrated embodiment, each side of the primary anchor module 94 includes a lateral flange 140, and each flange 140 includes apertures or holes 142 (FIGS. 10 and 11) extending through the flange 140 and arranged in a row along the length of the flange 140. Similarly, the frame 122 includes corresponding flanges 144 (FIG. 12) on each side, and each flange 144 includes holes (not shown) that may be aligned with the holes 142. A user passes a pin or bolt through the aligned holes (or passes multiple pins through multiple sets of aligned holes) of each pair of flanges 140, 144 to secure the static carriage 114 against movement relative to the primary anchor module 94. The frame 122 may be secured to the secondary anchor module 98 in a similar manner. In other embodiments, the frame 122 may be secured to the anchor modules 94, 98 in a different manner.

Referring again to FIG. 7, in the illustrated embodiment, a distance between the winch module 90 and the static carriage 114 defines a first length L1, which is the overall length of the LTU 66 in an initial configuration. As the static carriage 114 moves in the direction 124 from the primary anchor module 94 toward the secondary anchor module 98, the distance between the winch module 90 and the static carriage 114 changes. In a collapsed configuration (FIG. 17), the static carriage 114 is secured to the secondary anchor module 98, and the distance between the winch module 90 and the static carriage 114 defines a second length L2. In the illustrated embodiment, the second length L2 is shorter than L1.

Figure 16:
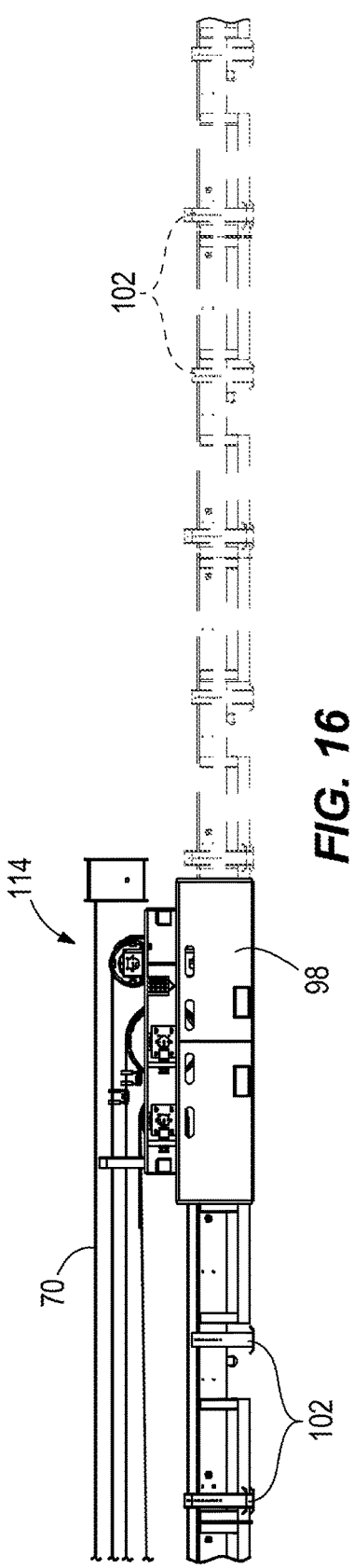
FIG. 16 is a side view of the loop take-up of FIG. 6 with standard modules partially disassembled.
Figure 17:
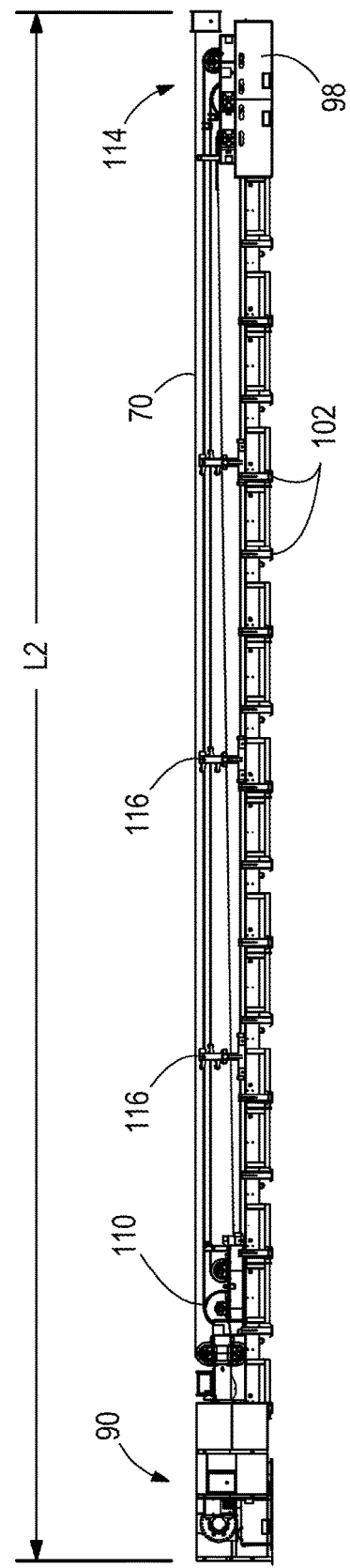
FIG. 17 is a side view of the loop take-up of FIG. 6 in a contracted state.

FIGS. 14-17 illustrate the process for moving the static carriage 114 in order to adjust the length of the LTU 66. The idler modules 116 between the primary anchor module 94 and the secondary anchor module 98 are removed, and any safety guard structures (not shown) are removed to permit the operator(s) to access the static carriage 114. The static carriage 114 is then unsecured relative to the primary anchor module 94. As shown in FIG. 14, the static carriage 114 then moves along the rails 106 in a travel direction 150 toward a secondary position on the secondary anchor module 98. The static carriage 114 is releasably secured to the secondary anchor module 98 (FIG. 15). As shown in FIG. 16, the primary anchor module 94 and the standard modules 102 between the secondary anchor module 98 and the primary anchor module 94 are no longer required, so they can be disassembled and removed at any time after the conveyor 50 has been shortened. The gate conveyor 50 can continue to operate while this structure is disassembled, since the belt 70 travels continuously between the end 48 of the gate conveyor 50 proximate the beam stage loader 38 (FIG. 3) and the end 84 of the gate conveyor 50 proximate the discharge portion 62 (FIG. 5). FIG. 17 illustrates a collapsed or contracted state of the LTU 66, in which the overall length of the LTU 66 is L2.

In the illustrated embodiment, the static carriage 114 may be selectively secured to the primary anchor module 94 and the secondary anchor module 98. In other embodiments, one or more of the standard modules 102 may include a mechanism for securing the static carriage 114 against movement, at least temporarily.

In one embodiment, the process includes 1) emptying the gate conveyor 50 of any material; 2) isolating the drive unit 54 and the winch module 90; 3) removing any safety guards (not shown) on the primary anchor module 94 to permit access to the static carriage 114; 4) unlocking the static carriage 114 and removing spacer plates so that the rollers 130 engage the rails 134 of the primary anchor module 94 and the rails 106 of the standard modules 102; and 5) manually operating the winch to move the dynamic carriage 110 in the outbye direction. Due to the tension in the belt 70, the static carriage 114 will follow the dynamic carriage 110. Once the static carriage 114 is positioned at the desired location (e.g., the secondary anchor module 98), the operator secures the static carriage 114 and lifts the carriage 114 so that the rollers 130 are spaced from the rails 134. The operator then re-inserts the spacer plates, re-assembles any guards, and removes the additional standard modules 102 that are no longer required.

As the mining operation progresses, the gate conveyor 50 must change its overall length to accommodate the movement of the mining machine 10 and mine face 14. In some embodiments, the LTU 66 is capable of storing between about 250 meters and about 300 meters of belt 70, which accommodates an equal movement of the mining machine 10 through the mine seam 18. But once the mining machine 10 reaches the end of a block of the mine seam 18, the components of the gate conveyor 50 prevent further mining. Conventional LTUs include an inbye end that is fixed or anchored to the mine floor, and the physical length of a conventional LTU cannot be modified. Instead, the conventional LTU must be physically moved once the mining operation progresses to a predetermined point. The LTU is moved by 1) removing the belt; 2) unbolting the fixed end; 3) removing the standard modules; and 4) re-installing the fixed end in the new location. The reinstallation of the fixed end requires bolting the fixed end to the floor and requires pre-planning of accompanying civil works to permit the load conditions. This process is time-consuming and results in significant downtime.

In contrast, the LTU 66 provides a simpler mechanism for changing the overall length of the gate conveyor 50. The length of the LTU 66 can be reduced without cutting or removing belt 70, thereby reducing disruption to the mining operation. This effectively extends the length of the mine seam block that can be excavated before moving the conveyor 50, reducing overall downtime caused by servicing the conveyor 50. For example, FIG. 18 illustrates the additional length 146 of material that can be mined from the block 18 before the conveyor 50 must be re-positioned. In some embodiments, moving the static carriage 114 provides an additional length 146 of approximately 30 meters, allowing the mining machine 10 to operate for 10% to 12% longer between re-positioning the conveyor structure.

Also, some of the LTU structure (e.g., the primary anchor module 94 and some of the standard modules 102) can be disassembled gradually such that the mining operation can continue. The operator's exposure to moving parts or belts during this process is minimized. In general, these benefits permit more material to be mined in less time. Furthermore, an operator may plan to modify the LTU 66 at approximately the same time (or shortly thereafter) when the belt 70 must be added/removed from the LTU 66 in order to maximize the operation time of the conveyor 50 and reduce downtime.

Although aspects have been described in detail with reference to certain preferred embodiments, variations and modifications exist within the scope and spirit of one or more independent aspects as described.

What is claimed is:

1. A conveyor system comprising:
    a first end configured to receive material;
    a second end for discharging the material;
    a continuous belt traveling in an endless loop between the first end and the second end;
    a drive motor for moving the continuous belt between the first end and the second end; and
    a tensioning mechanism engaging a portion of the continuous belt, the tensioning mechanism including,
       a stationary end including a drive unit,
       an anchor structure,
       a first carriage coupled to the drive unit and supporting a portion of the belt, the first carriage driven by the drive unit and supported for movement relative to the stationary end to adjust a tension in the belt, and
       a second carriage releasably secured to the anchor structure and supporting another portion of the belt, the second carriage supported for movement relative to the anchor structure between a first position and a second position, a first distance between the first position and the drive unit being different from a second distance between the second position and the drive unit.

2. The conveyor system of claim 1, wherein the tensioning mechanism further includes a plurality of frames spaced apart from one another and positioned between the stationary end and the anchor structure, each of the frames supporting at least one of the first carriage and the second carriage for movement.

3. The conveyor system of claim 2, wherein each frame includes a pair of rails, and wherein the second carriage includes rollers rollingly engaging the rails.

4. The conveyor system of claim 1, wherein when the second carriage is secured to the anchor structure, movement of the first carriage relative to the stationary end adjusts a tension in the belt.

5. The conveyor system of claim 1, wherein when the second carriage is unsecured relative to the anchor structure, movement of the first carriage relative to the stationary end causes a corresponding movement of the second carriage.

6. The conveyor system of claim 1, wherein the anchor structure is a first anchor structure, and the tensioning mechanism further includes a second anchor structure positioned between the stationary end and the first anchor structure, wherein the second carriage is releasably secured to the second anchor structure at the second position.

7. The conveyor system of claim 1, wherein the anchor structure includes at least one aperture, wherein the second carriage includes a carriage frame having at least one aperture, wherein the second carriage is secured against movement relative to the anchor structure by aligning the at least one aperture of the anchor structure with the at least one aperture of the carriage frame and passing a member through the aligned apertures.

8. The conveyor system of claim 1, wherein movement of the second carriage changes the maximum take-up length of the tensioning mechanism.

9. A tensioning mechanism for a conveyor system, the tensioning mechanism comprising:
    a first end including a drive unit;
    an anchor structure;
    a continuous belt extending at least partially between the drive unit and the anchor structure;
    a first carriage coupled to the drive unit and supporting a portion of the belt, the first carriage supported for movement relative to the drive unit to adjust a tension in the belt, the first carriage movable between the drive unit and an intermediate position located between the drive unit and the anchor structure; and
    a second carriage releasably secured to the anchor structure and supporting another portion of the belt, the second carriage supported for movement relative to the anchor structure between a first position and a second position, a distance between the first end and the second carriage defining a take-up length, wherein movement of the second carriage changes the take-up length.

10. The tensioning mechanism of claim 9, further comprising a plurality of frames spaced apart from one another and positioned between the first end and the anchor structure, each of the frames supporting at least one of the first carriage and the second carriage for movement.

11. The tensioning mechanism of claim 10, wherein each frame includes a pair of rails, and wherein the second carriage includes rollers rollingly engaging the rails.

12. The tensioning mechanism of claim 9, wherein the anchor structure is a first anchor structure, and further comprising a second anchor structure positioned between the first end and the first anchor structure, wherein the second carriage may be releasably secured to the second anchor structure.

13. The tensioning mechanism of claim 9, wherein the anchor structure includes at least one aperture wherein the second carriage includes a carriage frame having at least one aperture, wherein the second carriage is secured against movement relative to the anchor structure by aligning the at least one aperture of the anchor structure with the at least one aperture of the carriage frame and passing a member through the aligned apertures.

14. The tensioning mechanism of claim 9, wherein when the second carriage is secured to the anchor structure, movement of the first carriage relative to the first end adjusts a tension in the belt.

15. The tensioning mechanism of claim 9, wherein when the second carriage is unsecured relative to the anchor structure, movement of the first carriage relative to the first end causes a corresponding movement of the second carriage.

16. A method for changing a physical length of a tensioning mechanism for a conveyor system, the tensioning mechanism including a first carriage supported for movement relative to a first end and a second carriage releasably secured to a first anchor structure proximate a second end, the first carriage supporting a portion of a continuous belt, the second carriage supporting another portion of the continuous belt, the method comprising:
    unsecuring the second carriage relative to the first anchor structure;
    moving the second carriage along a support structure away from the first anchor structure; and
    securing the second carriage to a second anchor structure at a second position.

17. The method of claim 16, wherein unsecuring the second carriage includes removing a member extending through an aperture positioned on the second carriage frame and an aperture positioned on the first anchor structure.

18. The method of claim 16, wherein moving the second carriage includes rolling the second carriage along a rail supported by the support structure toward the first end.

19. The method of claim 16, wherein moving the second carriage includes operating a drive unit to move the first carriage toward the first end, the movement of the first carriage causing a corresponding movement of the second carriage toward the first end.

20. The method of claim 16, wherein the second position is located between the first end and the first anchor structure, the method further comprising, after securing the second carriage, removing the first anchor structure and the support structure positioned between the first anchor structure and the second anchor structure.

* * * * *